United States Patent [19]

Lautenschläger

[11] Patent Number: 5,031,269
[45] Date of Patent: Jul. 16, 1991

[54] WHEEL FOR ROLLING DRAWER SLIDES

[75] Inventor: Horst Lautenschläger, Reinheim, Fed. Rep. of Germany

[73] Assignee: Karl Lautenschläger GmbH & Co. KG, Reinheim, Fed. Rep. of Germany

[21] Appl. No.: 504,246

[22] Filed: Apr. 4, 1990

[30] Foreign Application Priority Data

Apr. 5, 1989 [DE] Fed. Rep. of Germany ....... 3910934

[51] Int. Cl.⁵ .............................................. B60B 33/00
[52] U.S. Cl. ............................................. 16/45; 16/91; 16/102; 16/106; 16/107; 152/323
[58] Field of Search ................... 16/45, 91, 102, 106, 16/107; 152/246, 323, 324, 325, 327; 301/5.3, 5.7, 63 PW; 312/337, 340, 341.1

[56] References Cited

U.S. PATENT DOCUMENTS

| 2,145,343 | 1/1939 | Dempsey | 16/45 |
| 2,665,521 | 1/1954 | Ford | 152/323 |
| 3,062,254 | 11/1962 | Keefe | 301/63 PW |
| 4,639,145 | 1/1987 | Lautenschläger | 312/341.1 |
| 4,699,432 | 10/1987 | Klamer | 301/5.3 |

Primary Examiner—Richard K. Seidel
Assistant Examiner—Chuck Y. Mah

[57] ABSTRACT

A wheel (10) for rolling drawer guides in furniture construction. A wheel body journaled on a wheel shaft and made from a hard plastic of good stability of shape has a circumferential, groove-like gap opening into the wheel rim, and in it there is disposed a tire of resiliently deformable material, preferably elastomeric plastic, protruding slightly above the rim surface of the wheel body. In at least one of the confronting side surfaces and/or in the circumferential bottom surface of the groove-like gap there is provided at least one, preferably a plurality of indentations in which the material of the tire, converted to fluid from and then to the resiliently deformable state, interlockingly engages. From one of the outer faces of the walls at least one injection hole extends into the groove-like gap.

7 Claims, 3 Drawing Sheets

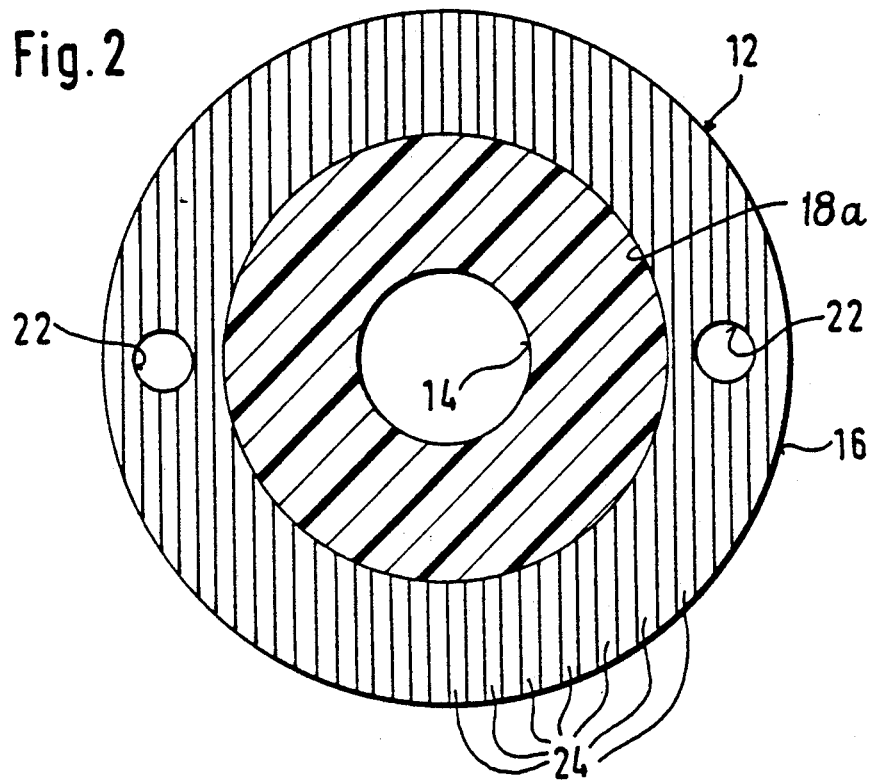
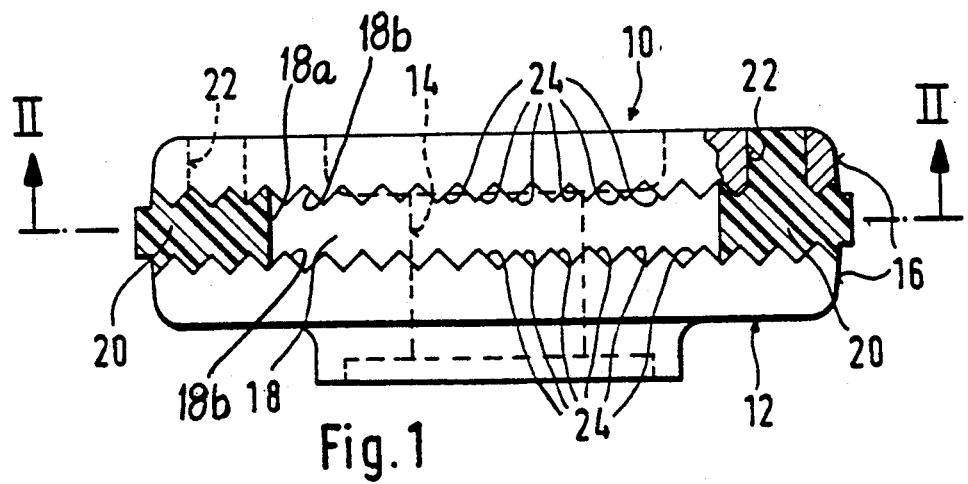

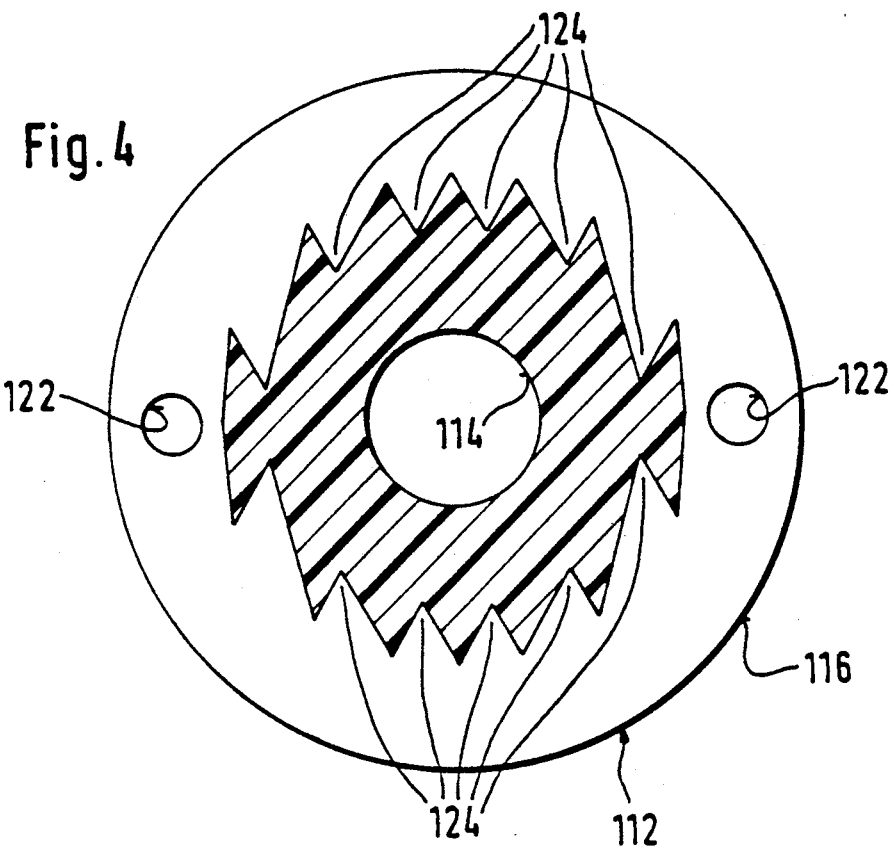
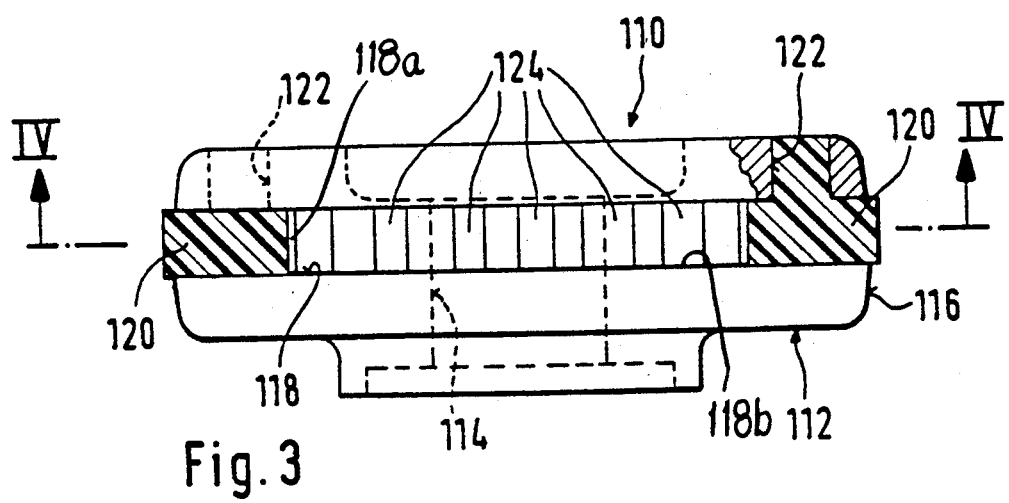

WHEEL FOR ROLLING DRAWER SLIDES

BACKGROUND OF THE INVENTION

The invention relates to a wheel for rolling guides for drawers and other such pull-out furniture parts, whose body made from a hard plastic of good stability of shape and mounted for rotation on an axle has a circumferential, groove-like gap in its rim, in which a tire of resiliently deformable material, preferably an elastomeric plastic, projecting slightly above the tread of the wheel body, is disposed.

In drawer guides which are equipped with such wheels (German Federal Gebrauchsmuster 71 29 122), the resiliently deformable tires serve to suppress the rolling noise made when the wheel rims roll on the guide rails and running rails of the drawer guide. To prevent the resiliently deformable wheel tires from permanently deforming in the course of time due to the pressure of the weight of the drawable cabinet part, especially when the drawer guide is in the closed position, it has been found desirable to relieve the tires of the load by appropriately shaping the running surfaces of the guide rails and/or running rails in the areas associated with the end position of the wheels (German Federal Patent Disclosure document 35 21 860). The tires are formed in the known wheels by rubber rings disposed in circumferential grooves in the wheels. It has been found, however, that these resilient tires, especially in the case of more heavily loaded wheels, tend in the course of time to stretch, in which case the danger then exists that the tires may come out of the grooves.

It is the object of the invention, accordingly, to improve the known wheels such that the tires will be held reliably in the corresponding groove-like gap in the wheel body, even in the case of heavily loaded drawer guides, and thus assure the desired quieting over the entire life of the piece of furniture.

Setting out from a wheel of the kind mentioned above, this object is achieved in accordance with the invention in that, in at least one of the confronting side surfaces and/or in the circumferential bottom surface of the groove-like gap, at least one, preferably more, indentations are provided in which the material of the tire, put into fluid form and then converted to the resiliently deformable state, interlockingly engages, and that a hole for the injection of the still fluid tire material opens in a outside face of the side walls of the wheel body of good stability of shape, while its other end opens in the interior of the groove-like gap. In a wheel thus configured, the tire is held interlockingly in the groove-like gap of the wheel body, so that any loosening is avoided, along with the danger that the tire might stretch and fall out of the gap.

The indentation or indentations in the side wall or walls and/or bottom surface of the groove-like gap run preferably in the opening direction of the parts of the wheel body injection mold which forms the groove-like gap, and they are formed so that they have no undercut interfering with the opening of the mold. Thus it is possible to injection-mold the wheel body, including the groove-like gap, in one piece. The tire is then installed by injecting still-fluid material forming the tire into the injection hole until the groove-like gap is completely filled. It is clear that during the injection process the gap must be closed on the wheel rim by a mold part completely surrounding it, such that the desired external shape of the tire, protruding slightly above the rim surface of the wheel, is formed.

If the indentations are provided in one or both side walls of the groove-like gap, it is recommended that they be configured as parallel grooves running in a straight line in the mold-opening direction. A configuration has proven particularly desirable in which the grooves have a triangular or trapezoidal cross section flaring from the bottom of the groove.

If the indentations, alone or in addition to the indentations in the side walls, are provided in the bottom surface of the circumferential gap, it is recommended to configure them as grooves running parallel to the axis of rotation of the wheel, with their ends pointing in the direction in which the associated part of the mold opens.

These grooves, too, can then have a cross section flaring from the groove bottom in the direction in which the mold opens.

Alternatively or additionally, the indentations can be formed also by at least one through-bore provided in the bottom surface of the circumferential gap, running in the direction in which the mold opens, and opening at both ends in the bottom surface, while the injection hole(s) then open at their wheel-body-interior end in the through-bores or in one of the latter.

BRIEF DESCRIPTION OF THE DRAWINGS

The invention will be further explained in the description that follows of several embodiments in connection with the drawing, wherein:

FIG. 1 is a view, partially cut away, of the rim of a first embodiment of a wheel configured in the manner of the invention, in which the resilient tire of the wheel is represented in a horizontal central section, FIG. 2 is a view showing a section through the body of the wheel, seen in the direction of arrows II—II in FIG. 1, FIG. 3 is a view corresponding to FIG. 1 of a second embodiment of a wheel in accordance with the invention, FIG. 4 is a view showing a section through the body of the wheel, seen in the direction of arrows IV—IV in FIG. 3.

DESCRIPTION OF PREFERRED EMBODIMENTS

Figure 6:
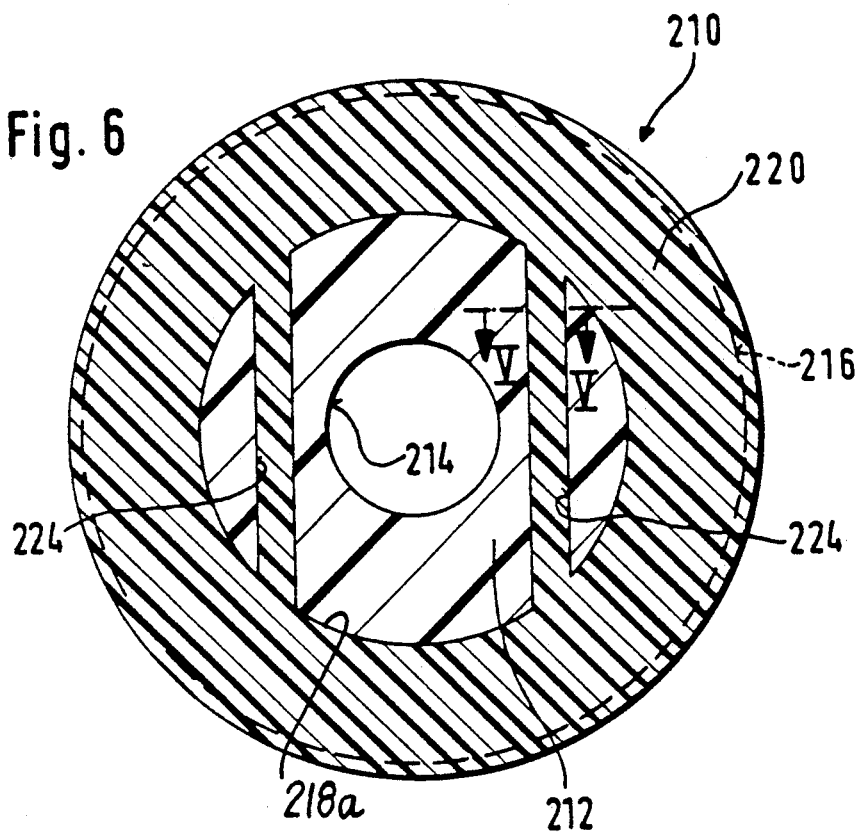
FIG. 6 is a view showing a section seen in the direction of the arrows VI—VI in FIG. 5.

The wheel shown in FIG. 1, and identified as a whole by the number 10, has a hard wheel body 12 made by injection molding from an appropriate plastic and being in the form of a relatively thick, circular disk provided with a central bore 14 which forms the bearing bore for the rotatable mounting of the wheel body 12 on a journal pin, not shown, which is fastened to the running rail or guide rail of a drawer guide. In the rim 16 of the wheel body 12, which is formed by the circumferential surface of the circular disk, a circumferential, groove-like gap 18 is provided, which has a bottom surface 18a and lateral surfaces 18b and is filled by a tire 20 of a resiliently deformable material, preferably an elastomeric plastic, this tire 20 projecting radially slightly above the rim 16 of the wheel body 12, so that the weight of a drawable furniture part, a drawer for example, provided with wheels 10 will be applied, primarily by the projecting section of the tire 20, to the associated portion of the running or guiding rail of the drawer guide. Due to the resilient deformability of the material of the tire, the latter, regardless of the weight of the drawable furniture part, will more or less deform resiliently, so that in the event of very great weight loading the projecting annular section of the tire 20 will be deformed back into the gap 18 in the area in which the weight is applied, and then a part of the weight will be transferred by the hard rim 16 of the roller body 12 to the associated running or guiding rail.

The placement of the tire 20 in the wheel 12 such that it not only completely fills the gap 18 but also protrudes radially above the rim 16 in the manner described, is accomplished by injecting the tire material in the fluid state through injection holes 22—two of them in the drawing—while the wheel body 12 is held in a mold surrounding it on all sides, in which an annular groove is formed in the area of the tire, and the injected material enters the groove and thus forms the tire portion that reaches radially above the rim. The material used in making the tire is either a thermoplastic in the hot state which has the desired resilient deformability after cooling, or a plastic prepared immediately before injection from two liquid components and then solidified in the elastomeric state by a chemical reaction of the two components. This chemical reaction (e.g., polycondensation) can be accelerated by applying heat to it through the mold.

In order to provide the tire 20 with permanent security against rotation in and escape from the gap 18, a plurality of parallel indentations or grooves 24 of triangular cross section flaring from the root of each groove of pointed cross section are provided in the lateral surfaces 18b laterally defining the gap 18. The grooves 24 therefore are not radial but, as stated, parallel, as best seen in FIG. 2. The reason for this lies in the fact that this kind of grooving permits the wheel body 12 to be made in one piece in an injection mold with only two slides forming the gap 18, which are drawn vertically upward or downward from the mold in order to strip the mold from the injection molded wheel body. If these grooves had been arranged radially, the wheel body could not in practice have been made by injection molding, but would have had to be made of two wheel body halves separated along the central plane running horizontally in FIG. 1, and joined, e.g. glued, together before the injection of the tire 20. This configuration of the wheel body, which is also to be taken into consideration as part of the idea of the invention, was avoided in the embodiment described on the basis of cost considerations.

In FIG. 2, in the right-hand, cut-away area of the wheel body, it can be seen that the material of the tire has been injected into the gap 18 through the injection hole 22, so that this injection hole 22 is also filled with tire material.

FIG. 3 represents a modified wheel 110 which differs from the wheel 10 of FIG. 1, described previously, only in a different configuration of the gap 118. The grooves 124 of triangular cross section, which prevent the rotation and stretching of the tire 120, are provided in this case not in the lateral surfaces, which in this case are flat, but, as it can be seen in FIG. 4, they are provided in the bottom of the groove 118 such that, again, the wheel body 112 can be made as a one-piece injection molding whose gap 118 is formed, again, by two appropriately shaped slides of appropriate shape which can be extracted from the mold in opposite directions. Otherwise the wheel 110 is the same as wheel 10, so that with regard to the rest of its configuration it suffices to refer to the description of wheel 10, inasmuch as equal parts of the wheels 110 and 10 are associated in the drawing with the same reference numbers, preceded only by a "1" in the case of the wheel 110.

Figure 5:
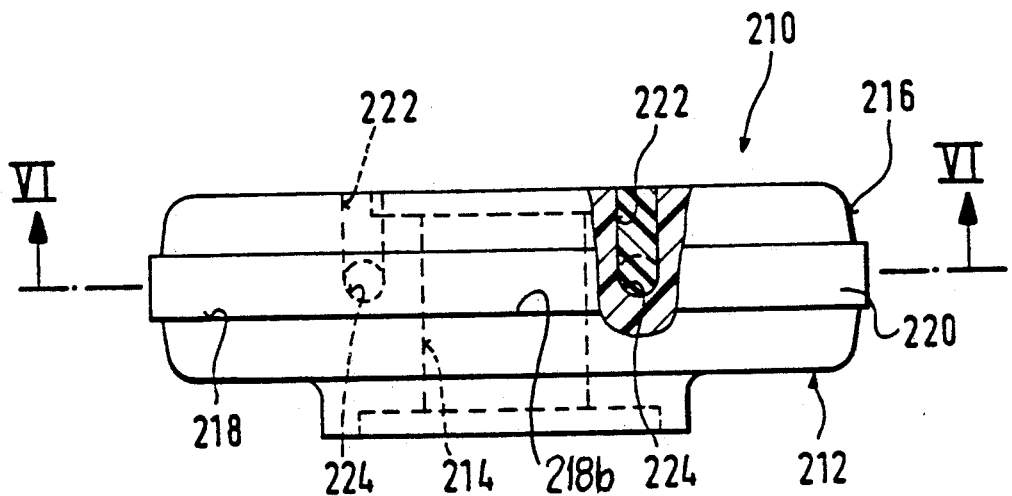
FIG. 5 is a view of the tread surface of a third embodiment of a wheel in accordance with the invention, which differs from those shown in FIGS. 1 and 3 in that the resilient tire is shown in section only in the cut-away portion.

Finally, in FIGS. 5 and 6 there is shown another variant wheel 210 which differs from the described wheels 10 and 110 again only in the configuration of the groove-like gap 218 for the tire 220, so that in this case again, only the difference in the configuration of this gap 218 is described, while the description of wheel 10 can be referred to concerning the general construction of the wheel 210. Equal parts of the wheels 210 and 10 are again associated with the same reference numbers except that a "2" precedes the reference number in the case of wheel 210.

The gap 218 in the wheel body 212 in this case has flat side surfaces and a cylindrical bottom surface, the tire 220 being held in the gap 218 by two through-bores 224 which pass through the core of the wheel body 212 vertically (referring to FIG. 6) at a distance apart on opposite sides of the bearing bore 214, and thus open at a total of four points in the bottom surface of the gap 218. Into each of the through bores 224 an injection bore leads through which the tire material is injected into the wheel body. After the tire material stiffens, therefore, bars of the tire material form in the through-bores 224, and form an integral unit with the actual tire 220 and thus prevent any rotation or expansion of the tire 20.

It is apparent that modifications and improvements of the described embodiments can be made within the scope of the invention. For example, the grooves 24 provided in the lateral surfaces of the gap 18, and the grooves 124 provided in the bottom of the gap 118, can also be provided at the same time. The same also applies to the combination of the through-bores 224 with grooves 24 and/or grooves 124. In the preferred one-piece manufacture of the wheel body, care must be taken in any case only that the grooves 24 and 124, and the through bore 224, run in each case in the direction in which the sliding mold part forming the gap opens. If the body of the wheel is made from two separately produced body halves, other arrangements, e.g., radial arrangements of the grooves 24 and 124 can be taken into consideration.

I claim:

1. An injection-molded wheel for a rolling guide of a drawable furniture part, comprising a wheel body made from a shape-stable hard plastic, and having a central bore for rotatably mounting of the wheel body on a wheel axle, said wheel body also having two outside faces, having a bottom surface and a circumferential rim and a circumferential groove-like gap open to the rim and defined by two confronting lateral surfaces and the bottom surface; at least one of said lateral surfaces and said bottom surfaces having at least one indentation, and at least one hole extending from one of said outside faces to one of the confronting lateral surfaces; and a tire of resiliently deformable material in said gap and projecting slightly above the rim.

2. A wheel according to claim 1, wherein the at least one indentation in the surface of the gap extends to define a path for an opening direction of an injection mold for the wheel body and is without undercut hindering opening of the mold.

3. A wheel according to claim 2, comprising at least two indentations formed by parallel grooves in the confronting lateral surfaces of the groove-like gap and extending rectilinearly to define a path for an opening direction of the injection mold for the wheel body and for confronting surfaces of the groove-like gap.

4. A wheel according to claim 3, wherein the grooves have a triangular cross section flaring conically outwardly from the confronting surfaces.

5. A wheel according to claim 1, comprising indentations in the bottom surface of the groove-like gap in the form of grooves running parallel to the axis of the bore and opening in an opening direction of an injection mold.

6. A wheel according to claim 5, wherein the grooves have a cross section flaring conically outwardly from the bottom surface.

7. A wheel according to claim 1 wherein the at least one indentation is formed by a through-bore in the bottom surface extending to define a path for an opening direction of an injection mold.

* * * * *